(12) United States Patent
Sishtla et al.

(10) Patent No.: US 9,244,157 B1
(45) Date of Patent: Jan. 26, 2016

(54) WEATHER RADAR THREAT DEPICTION SYSTEM AND METHOD

(71) Applicants: Venkata A. Sishtla, Marion, IA (US); Roy E. Robertson, Marion, IA (US); Edward A. St. John, Solon, IA (US); Mark C. Fersdahl, Cedar Rapids, IA (US); Louis P. Nicoli, Melbourne, FL (US)

(72) Inventors: Venkata A. Sishtla, Marion, IA (US); Roy E. Robertson, Marion, IA (US); Edward A. St. John, Solon, IA (US); Mark C. Fersdahl, Cedar Rapids, IA (US); Louis P. Nicoli, Melbourne, FL (US)

(73) Assignee: ROCKWELL COLLINS, INC., Cedar Rapids, IA (US)

( * ) Notice: Subject to any disclaimer, the term of this patent is extended or adjusted under 35 U.S.C. 154(b) by 331 days.

(21) Appl. No.: 13/919,406

(22) Filed: Jun. 17, 2013

(51) Int. Cl.
G01S 13/95 (2006.01)
G01S 7/06 (2006.01)

(52) U.S. Cl.
CPC ............... *G01S 7/062* (2013.01); *G01S 13/95* (2013.01); *G01S 13/953* (2013.01)

(58) Field of Classification Search
CPC ............ G01S 13/95–13/958; G01S 7/04; G01S 7/062; G01S 7/10; G01S 7/12
USPC ........ 342/26 R, 26 A, 26 B, 26 C, 26 D, 179, 342/181, 182
See application file for complete search history.

(56) References Cited

U.S. PATENT DOCUMENTS

| 650,275 | A | 5/1900 | Reeve |
|---|---|---|---|
| 3,251,057 | A | 5/1966 | Buehler et al. |
| 3,359,557 | A | 12/1967 | Fow et al. |
| 3,404,396 | A | 10/1968 | Buchler et al. |
| 3,465,339 | A | 9/1969 | Marner |
| 3,491,358 | A | 1/1970 | Hicks |
| 3,508,259 | A | 4/1970 | Andrews |
| 3,540,829 | A | 11/1970 | Collinson et al. |
| 3,567,915 | A | 3/1971 | Altshuler et al. |
| 3,646,555 | A | 2/1972 | Atlas |
| 3,715,748 | A | 2/1973 | Hicks |
| 3,764,719 | A | 10/1973 | Dell |
| 3,781,530 | A | 12/1973 | Britland et al. |
| 3,781,878 | A | 12/1973 | Kirkpatrick |

(Continued)

FOREIGN PATENT DOCUMENTS

| EP | 1 329 738 B1 | 7/2003 |
|---|---|---|
| FR | 2658617 A1 | 8/1991 |

(Continued)

OTHER PUBLICATIONS

U.S. Appl. No. 12/075,103, filed Mar. 7, 2008, Woodell et al.

(Continued)

*Primary Examiner* — Peter Bythrow
(74) *Attorney, Agent, or Firm* — Angel Gerdzhikov; Donna Suchy; Daniel Barbieri

(57) ABSTRACT

A method and system can display images associated with core threats, associated threats, and/or predictive overflight threats. The images of the weather can be displayed using at least a first color, a second color, and a third color associated with a respective first precipitation rate range, a second respective precipitation rate range, and a third respective precipitation rate range. The first precipitation rate range is less than the second precipitation rate range and the third precipitation rate range is more than the second precipitation rate range. The core threats, associated threats and predictive overflight threats can be displayed using the first, second and third colors, speckled areas, and wedge-shaped symbols.

20 Claims, 5 Drawing Sheets

(56) References Cited

U.S. PATENT DOCUMENTS

| | | |
|---|---|---|
| 3,803,609 A | 4/1974 | Lewis et al. |
| 3,885,237 A | 5/1975 | Kirkpatrick |
| 3,943,511 A | 3/1976 | Evans et al. |
| 3,964,064 A | 6/1976 | Brandao et al. |
| 3,968,490 A | 7/1976 | Gostin |
| 4,015,257 A | 3/1977 | Fetter |
| 4,043,194 A | 8/1977 | Tanner |
| 4,223,309 A | 9/1980 | Payne |
| 4,283,715 A | 8/1981 | Choisnet |
| 4,283,725 A | 8/1981 | Chisholm |
| 4,318,100 A | 3/1982 | Shimizu et al. |
| 4,346,595 A | 8/1982 | Frosch et al. |
| 4,430,654 A | 2/1984 | Kupfer |
| 4,435,707 A * | 3/1984 | Clark .......................... 342/26 B |
| 4,459,592 A | 7/1984 | Long |
| 4,533,915 A | 8/1985 | Lucchi et al. |
| 4,555,703 A | 11/1985 | Cantrell |
| 4,600,925 A | 7/1986 | Alitz et al. |
| 4,613,938 A | 9/1986 | Hansen et al. |
| 4,649,388 A | 3/1987 | Atlas |
| 4,658,255 A | 4/1987 | Nakamura et al. |
| 4,684,950 A | 8/1987 | Long |
| 4,742,353 A | 5/1988 | D'Addio et al. |
| 4,761,650 A | 8/1988 | Masuda et al. |
| 4,835,536 A | 5/1989 | Piesinger et al. |
| RE33,152 E | 1/1990 | Atlas |
| 4,914,444 A | 4/1990 | Pifer et al. |
| 4,928,131 A | 5/1990 | Onozawa |
| 4,940,987 A | 7/1990 | Frederick |
| 5,036,334 A | 7/1991 | Henderson et al. |
| 5,049,886 A | 9/1991 | Seitz et al. |
| 5,057,820 A | 10/1991 | Markson et al. |
| 5,077,558 A | 12/1991 | Kuntman |
| 5,105,191 A | 4/1992 | Keedy |
| 5,159,407 A | 10/1992 | Churnside et al. |
| 5,164,731 A | 11/1992 | Borden et al. |
| 5,173,704 A | 12/1992 | Buehler et al. |
| 5,177,487 A | 1/1993 | Taylor et al. |
| 5,198,819 A | 3/1993 | Susnjara |
| 5,202,690 A | 4/1993 | Frederick |
| 5,208,600 A | 5/1993 | Rubin |
| 5,221,924 A | 6/1993 | Wilson, Jr. |
| 5,262,773 A | 11/1993 | Gordon |
| 5,291,208 A | 3/1994 | Young |
| 5,296,865 A | 3/1994 | Lewis |
| 5,311,183 A * | 5/1994 | Mathews et al. ............ 342/26 B |
| 5,311,184 A | 5/1994 | Kuntman |
| 5,331,330 A | 7/1994 | Susnjara |
| 5,396,220 A | 3/1995 | Markson et al. |
| 5,402,116 A | 3/1995 | Ashley |
| 5,469,168 A | 11/1995 | Anderson |
| 5,479,173 A | 12/1995 | Yoshioka et al. |
| 5,485,157 A | 1/1996 | Long |
| 5,517,193 A | 5/1996 | Allison et al. |
| 5,521,603 A | 5/1996 | Young |
| 5,534,868 A | 7/1996 | Gjessing et al. |
| 5,568,151 A | 10/1996 | Merritt |
| 5,583,972 A | 12/1996 | Miller |
| 5,592,171 A | 1/1997 | Jordan |
| 5,602,543 A | 2/1997 | Prata et al. |
| 5,615,118 A | 3/1997 | Frank |
| 5,648,782 A | 7/1997 | Albo et al. |
| 5,654,700 A | 8/1997 | Prata et al. |
| 5,657,009 A | 8/1997 | Gordon |
| 5,686,919 A | 11/1997 | Jordan et al. |
| 5,726,656 A | 3/1998 | Frankot |
| 5,757,322 A | 5/1998 | Ray et al. |
| 5,771,020 A | 6/1998 | Markson et al. |
| 5,828,332 A | 10/1998 | Frederick |
| 5,838,239 A | 11/1998 | Stern et al. |
| 5,839,080 A | 11/1998 | Muller et al. |
| 5,907,568 A | 5/1999 | Reitan, Jr. |
| 5,920,276 A | 7/1999 | Frederick |
| 5,945,926 A | 8/1999 | Ammar et al. |
| 5,973,635 A | 10/1999 | Albo |
| 6,034,760 A | 3/2000 | Rees |
| 6,043,756 A | 3/2000 | Bateman et al. |
| 6,043,757 A | 3/2000 | Patrick |
| 6,081,220 A | 6/2000 | Fujisaka et al. |
| 6,138,060 A | 10/2000 | Conner et al. |
| 6,154,151 A | 11/2000 | McElreath et al. |
| 6,154,169 A | 11/2000 | Kuntman |
| 6,177,873 B1 | 1/2001 | Cragun |
| 6,184,816 B1 | 2/2001 | Zheng et al. |
| 6,201,494 B1 | 3/2001 | Kronfeld |
| 6,208,284 B1 | 3/2001 | Woodell et al. |
| 6,236,351 B1 | 5/2001 | Conner et al. |
| 6,240,369 B1 | 5/2001 | Foust |
| 6,246,367 B1 | 6/2001 | Markson et al. |
| 6,281,832 B1 | 8/2001 | McElreath |
| 6,289,277 B1 | 9/2001 | Feyereisen et al. |
| 6,297,772 B1 | 10/2001 | Lewis |
| 6,340,946 B1 | 1/2002 | Wolfson et al. |
| 6,381,538 B1 | 4/2002 | Robinson et al. |
| 6,388,607 B1 | 5/2002 | Woodell |
| 6,388,608 B1 | 5/2002 | Woodell et al. |
| RE37,725 E | 6/2002 | Yamada |
| 6,405,134 B1 | 6/2002 | Smith et al. |
| 6,424,288 B1 | 7/2002 | Woodell |
| 6,441,773 B1 * | 8/2002 | Kelly et al. .................. 342/26 R |
| 6,456,226 B1 | 9/2002 | Zheng et al. |
| 6,480,142 B1 | 11/2002 | Rubin |
| 6,496,252 B1 | 12/2002 | Whiteley |
| 6,501,392 B2 | 12/2002 | Gremmert et al. |
| 6,512,476 B1 | 1/2003 | Woodell |
| 6,518,914 B1 | 2/2003 | Peterson et al. |
| 6,549,161 B1 * | 4/2003 | Woodell ....................... 342/26 R |
| 6,560,538 B2 | 5/2003 | Schwinn et al. |
| 6,563,452 B1 | 5/2003 | Zheng et al. |
| 6,577,947 B1 | 6/2003 | Kronfeld et al. |
| 6,590,520 B1 | 7/2003 | Steele et al. |
| 6,597,305 B2 | 7/2003 | Szeto et al. |
| 6,603,425 B1 | 8/2003 | Woodell |
| 6,606,564 B2 | 8/2003 | Schwinn et al. |
| 6,614,382 B1 | 9/2003 | Cannaday et al. |
| 6,650,275 B1 | 11/2003 | Kelly et al. |
| 6,650,972 B1 * | 11/2003 | Robinson et al. .................. 701/3 |
| 6,667,710 B2 | 12/2003 | Cornell et al. |
| 6,670,908 B2 | 12/2003 | Wilson et al. |
| 6,677,886 B1 | 1/2004 | Lok |
| 6,683,609 B1 | 1/2004 | Baron et al. |
| 6,690,317 B2 | 2/2004 | Szeto et al. |
| 6,703,945 B2 | 3/2004 | Kuntman et al. |
| 6,720,906 B2 | 4/2004 | Szeto et al. |
| 6,738,010 B2 | 5/2004 | Steele et al. |
| 6,741,203 B1 | 5/2004 | Woodell |
| 6,744,382 B1 | 6/2004 | Lapis et al. |
| 6,771,207 B1 | 8/2004 | Lang |
| 6,788,043 B2 | 9/2004 | Murphy et al. |
| 6,791,311 B2 | 9/2004 | Murphy et al. |
| 6,828,922 B1 | 12/2004 | Gremmert et al. |
| 6,828,923 B2 | 12/2004 | Anderson |
| 6,839,018 B2 | 1/2005 | Szeto et al. |
| 6,850,185 B1 | 2/2005 | Woodell |
| 6,856,908 B2 | 2/2005 | Devarasetty et al. |
| 6,879,280 B1 * | 4/2005 | Bull et al. .................... 342/26 B |
| 6,882,302 B1 * | 4/2005 | Woodell et al. ............. 342/26 R |
| 6,917,860 B1 | 7/2005 | Robinson et al. |
| 6,977,608 B1 | 12/2005 | Anderson et al. |
| 7,030,805 B2 | 4/2006 | Ormesher et al. |
| 7,042,387 B2 | 5/2006 | Ridenour et al. |
| 7,082,382 B1 | 7/2006 | Rose et al. |
| 7,109,912 B1 * | 9/2006 | Paramore et al. ............ 342/26 B |
| 7,109,913 B1 * | 9/2006 | Paramore et al. ............ 342/26 B |
| 7,116,266 B1 | 10/2006 | Vesel et al. |
| 7,129,885 B1 | 10/2006 | Woodell et al. |
| 7,132,974 B1 | 11/2006 | Christianson |
| 7,139,664 B2 | 11/2006 | Kelly et al. |
| 7,145,503 B2 | 12/2006 | Abramovich et al. |
| 7,161,525 B1 * | 1/2007 | Finley et al. ................. 342/26 R |
| 7,200,491 B1 | 4/2007 | Rose et al. |
| 7,205,928 B1 * | 4/2007 | Sweet .......................... 342/26 B |
| 7,242,343 B1 | 7/2007 | Woodell |
| 7,259,714 B1 | 8/2007 | Cataldo |

(56) References Cited

U.S. PATENT DOCUMENTS

| | | | |
|---|---|---|---|
| 7,292,178 B1 | 11/2007 | Woodell et al. | |
| 7,307,576 B1* | 12/2007 | Koenigs | 342/26 R |
| 7,307,577 B1* | 12/2007 | Kronfeld et al. | 342/26 B |
| 7,307,583 B1 | 12/2007 | Woodell et al. | |
| 7,307,586 B2 | 12/2007 | Peshlov et al. | |
| 7,307,756 B2 | 12/2007 | Walmsley | |
| 7,352,317 B1 | 4/2008 | Finley et al. | |
| 7,352,929 B2 | 4/2008 | Hagen et al. | |
| 7,365,674 B2 | 4/2008 | Tillotson et al. | |
| 7,372,394 B1 | 5/2008 | Woodell et al. | |
| 7,383,131 B1 | 6/2008 | Wey et al. | |
| 7,391,358 B2* | 6/2008 | Dupree et al. | 342/25 R |
| 7,417,579 B1 | 8/2008 | Woodell | |
| 7,427,943 B1 | 9/2008 | Kronfeld et al. | |
| 7,471,995 B1 | 12/2008 | Robinson | |
| 7,486,219 B1* | 2/2009 | Woodell et al. | 342/26 B |
| 7,486,220 B1* | 2/2009 | Kronfeld et al. | 342/26 B |
| 7,492,304 B1 | 2/2009 | Woodell et al. | |
| 7,492,305 B1* | 2/2009 | Woodell et al. | 342/26 B |
| 7,515,087 B1* | 4/2009 | Woodell et al. | 342/26 B |
| 7,515,088 B1* | 4/2009 | Woodell et al. | 342/26 B |
| 7,528,613 B1 | 5/2009 | Thompson et al. | |
| 7,541,971 B1 | 6/2009 | Woodell et al. | |
| 7,557,735 B1 | 7/2009 | Woodell et al. | |
| 7,576,680 B1 | 8/2009 | Woodell | |
| 7,581,441 B2 | 9/2009 | Barny et al. | |
| 7,598,901 B2 | 10/2009 | Tillotson et al. | |
| 7,598,902 B1 | 10/2009 | Woodell et al. | |
| 7,633,428 B1 | 12/2009 | McCusker et al. | |
| 7,633,431 B1 | 12/2009 | Wey et al. | |
| 7,656,343 B1* | 2/2010 | Hagen et al. | 342/26 B |
| 7,664,601 B2 | 2/2010 | Daly, Jr. | |
| 7,696,921 B1* | 4/2010 | Finley et al. | 342/26 B |
| 7,714,767 B1 | 5/2010 | Kronfeld et al. | |
| 7,728,758 B2 | 6/2010 | Varadarajan et al. | |
| 7,733,264 B1* | 6/2010 | Woodell et al. | 342/26 B |
| 7,859,448 B1 | 12/2010 | Woodell et al. | |
| 7,868,811 B1* | 1/2011 | Woodell et al. | 342/26 B |
| 7,917,255 B1 | 3/2011 | Finley | |
| 7,973,698 B1 | 7/2011 | Woodell et al. | |
| 7,982,658 B2* | 7/2011 | Kauffman et al. | 342/26 B |
| 8,022,859 B2 | 9/2011 | Bunch et al. | |
| 8,054,214 B2 | 11/2011 | Bunch | |
| 8,072,368 B1 | 12/2011 | Woodell | |
| 8,081,106 B2 | 12/2011 | Yannone | |
| 8,089,391 B1 | 1/2012 | Woodell et al. | |
| 8,098,188 B2 | 1/2012 | Costes et al. | |
| 8,111,186 B2 | 2/2012 | Bunch et al. | |
| 8,159,369 B1* | 4/2012 | Koenigs et al. | 340/963 |
| 8,217,828 B2 | 7/2012 | Kirk | |
| 8,228,227 B2* | 7/2012 | Bunch et al. | 342/26 B |
| 8,314,730 B1 | 11/2012 | Musiak et al. | |
| 8,477,062 B1* | 7/2013 | Kanellis | 342/65 |
| 8,902,100 B1 | 12/2014 | Woodell et al. | |
| 2002/0039072 A1 | 4/2002 | Gremmert et al. | |
| 2003/0001770 A1* | 1/2003 | Cornell et al. | 342/26 |
| 2004/0239550 A1 | 12/2004 | Daly, Jr. | |
| 2005/0049789 A1 | 3/2005 | Kelly et al. | |
| 2006/0036366 A1 | 2/2006 | Kelly et al. | |
| 2008/0158049 A1 | 7/2008 | Southard et al. | |
| 2008/0165051 A1* | 7/2008 | Khatwa | 342/26 B |
| 2009/0177343 A1* | 7/2009 | Bunch et al. | 701/14 |
| 2009/0219197 A1* | 9/2009 | Bunch | 342/26 B |
| 2010/0019938 A1 | 1/2010 | Bunch | |
| 2010/0042275 A1 | 2/2010 | Kirk | |
| 2010/0103029 A1* | 4/2010 | Khatwa et al. | 342/26 B |
| 2010/0194628 A1 | 8/2010 | Christianson et al. | |
| 2010/0201565 A1* | 8/2010 | Khatwa | 342/26 B |
| 2011/0148694 A1* | 6/2011 | Bunch et al. | 342/26 B |
| 2012/0029786 A1 | 2/2012 | Calandra et al. | |
| 2012/0133551 A1 | 5/2012 | Pujol et al. | |
| 2012/0139778 A1 | 6/2012 | Bunch et al. | |
| 2013/0226452 A1 | 8/2013 | Watts | |
| 2013/0234884 A1* | 9/2013 | Bunch et al. | 342/26 B |
| 2014/0361923 A1* | 12/2014 | Bunch et al. | 342/26 B |

FOREIGN PATENT DOCUMENTS

| | | |
|---|---|---|
| WO | WO-98/07047 A1 | 2/1998 |
| WO | WO-98/22834 | 5/1998 |
| WO | WO-03/005060 | 1/2003 |
| WO | WO-2009/137158 | 11/2009 |

OTHER PUBLICATIONS

Advisory Action for U.S. Appl. No. 12/075,103, mail date Feb. 13, 2013, 3 pages.

Advisory Action for U.S. Appl. No. 12/075,103, mail date Nov. 8, 2010, 3 pages.

Advisory Action for U.S. Appl. No. 12/075,103, mail date Oct. 15, 2010, 3 pages.

Bovith et al., Detecting Weather Radar Clutter by Information Fusion with Satellite Images and Numerical Weather Prediction Model Output; Jul. 31-Aug. 4, 2006, 4 pages.

Burnham et al., Thunderstorm Turbulence and Its Relationship to Weather Radar Echoes, J. Aircraft, Sep.-Oct. 1969, 8 pages.

Corridor Integrated Weather System (CIWS), www.ll.mit.edu/mission/aviation/faawxsystems/ciws.html, received on Aug. 19, 2009, 3 pages.

Doviak et al., Doppler Radar and Weather Observations, 1984, 298 pages.

Dupree et al.,FAA Tactical Weather Forecasting in the United States National Airspace, 29 pages.

Goodman et al., Lisdad Lightning Observations during the Feb. 22-23, 1998 Central Florida Tornado Outbreak, http:www.srh.noaa.gov/topics/attach/html/ssd98-37.htm, Jun. 1, 1998, 5 pages.

Hodanish, Integration of Lightning Detection Systems in a Modernized National Weather Service Office, http://www.srh.noaa.gov/mlb/hoepub.html, retrieved on Aug. 6, 2007, 5 pages.

Honeywell, RDR-4B Forward Looking Windshear Detection/Weather Radar System User's Manual with Radar Operation Guidelines, Jul. 2003, 106 pages.

Keith, Transport Category Airplane Electronic Display Systems, Jul. 16, 1987, 34 pages.

Klingle-Wilson et al., Description of Corridor Integrated Weather System (CIWS) Weather Products, Aug. 1, 2005, 120 pages.

Kuntman et al, Turbulence Detection and Avoidance System, Flight Safety Foundation 53rd International Air Safety Seminar (IASS), Oct. 29, 2000, 13 pages.

Kuntman, Airborne System to Address Leading Cause of Injuries in Non-Fatal Airline Accidents, ICAO Journal, Mar. 2000, 4 pages.

Meteorological/KSC/L71557/Lighting Detection and Ranging (LDAR), Jan. 2002, 12 pages.

Nathanson, Fred E., "Radar and Its Composite Environment," Radar Design Principles, Signal Processing and the Environment, 1969, McGraw-Hill Book Company, New York et al., 5 pages.

Notice of Allowance for U.S. Appl. No. 10/631,253, mail date Jul. 28, 2005, 7 pages.

Notice of Allowance for U.S. Appl. No. 11/256,845, mail date May 27, 2009, 7 pages.

Notice of Allowance for U.S. Appl. No. 11/370,085, mail date Dec. 30, 2008, 6 pages.

Notice of Allowance for U.S. Appl. No. 11/402,434, mail date Nov. 4, 2008, 6 pages.

Notice of Allowance for U.S. Appl. No. 12/474,102, mail date Jan. 20, 2012, 6 pages.

Office Action for U.S. Appl. No. 11/256,845, mail date Aug. 21, 2007, 4 pages.

Office Action for U.S. Appl. No. 10/631,253, mail date Jan. 14, 2004, 5 pages.

Office Action for U.S. Appl. No. 10/631,253, mail date Jun. 30, 2004, 4 pages.

Office Action for U.S. Appl. No. 11/256,845, mail date Dec. 5, 2006, 5 pages.

Office Action for U.S. Appl. No. 11/256,845, mail date Jul. 28, 2008, 5 pages.

Office Action for U.S. Appl. No. 11/256,845, mail date Jun. 22, 2006, 5 pages.

(56) References Cited

OTHER PUBLICATIONS

Office Action for U.S. Appl. No. 11/370,085, mail date Aug. 15, 2007, 10 pages.
Office Action for U.S. Appl. No. 11/370,085, mail date Dec. 4, 2007, 13 pages.
Office Action for U.S. Appl. No. 11/370,085, mail date Oct. 9, 2008, 5 pages.
Office Action for U.S. Appl. No. 11/402,434, mail date Jul. 17, 2008, 5 pages.
Office Action for U.S. Appl. No. 11/402,434, mail date Mar. 29, 2007, 8 pages.
Office Action for U.S. Appl. No. 11/402,434, mail date Oct. 26, 2006, 7 pages.
Office Action for U.S. Appl. No. 11/402,434, mail date Sep. 20, 2007, 7 pages.
Office Action for U.S. Appl. No. 12/075,103, mail date Feb. 26, 2010, 11 pages.
Office Action for U.S. Appl. No. 12/075,103, mail date Jul. 29, 2010, 7 pages.
Office Action for U.S. Appl. No. 12/075,103, mail date Jun. 20, 2012, 5 pages.
Office Action for U.S. Appl. No. 12/075,103, mail date Nov. 29, 2012, 6 pages.
Office Action for U.S. Appl. No. 12/474,102, mail date Sep. 7, 2011, 8 pages.
Office Action for U.S. Appl. No. 13/717,052, mail date Aug. 22, 2013, 15 pages.
Office Action on U.S. Appl. No. 12/075,103 Dated Jul. 31, 2013, 8 pages.
Pessi et al., On the Relationship Between Lightning and Convective Rainfall Over the Central Pacific Ocean, date unknown, 9 pages.
Waldvogel et al., The Kinetic Energy of Hailfalls. Part I: Hailstone Spectra, Journal of Applied Meteorology, Apr. 1978, 8 pages.
Wilson et al., The Complementary Use of Titan-Derived Radar and Total Lightning Thunderstorm Cells, 10 pages.
Zipser et al., The Vertical Profile of Radar Reflectivity and Convective Cells: A Strong Indicator of Storm Intensity and Lightning Probability? America Meteorological Society, 1994, 9 pages.
U.S. Appl. No. 13/841,893, filed Mar. 15, 2013, Rockwell Collins, Inc.
U.S. Appl. No. 13/919,406, filed Jun. 17, 2013, Rockwell Collins, Inc.
U.S. Appl. No. 14/086,844, filed Nov. 21, 2013, Rockwell Collins, Inc.
U.S. Appl. No. 14/206,651, filed Mar. 12, 2014, Rockwell Collins, Inc.
U.S. Appl. No. 14/207,034, filed Mar. 12, 2014, Rockwell Collins, Inc.
3-D Weather Hazard and Avoidance System, Honeywell InteVue Brochure dated Nov. 2008, 4 pages.
Greene et al., Vertically Integrated Liquid Water—A New Analysis Tool, Monthly Weather Review, Jul. 1972, 5 pages.
Kuntman, Satellite Imagery: Predicting Aviation Weather Hazards, ICAO Journal, Mar. 2000, 4 pps.
Office Action on U.S. Appl. No. 12/075,103 Dated Apr. 9, 2014, 5 pages.
Office Action on U.S. Appl. No. 13/246,769 Dated Apr. 21, 2014, 18 pages.
Office Action on U.S. Appl. No. 13/717,052 Dated Dec. 23, 2013, 7 pages.
RDR-4B Honeywell User Manual for Forward Looking Windshear Detection/Weather Radar System, Rev. 6, Jul. 2003, 106 pps.
Robinson et al., En Route Weather Depiction Benefits of the Nexrad Vertically Integrated Liquid Water Product Utilized by the Corridor Integrated Weather System, 10th Conference on Aviation, Range, and Aerospace Meteorology (ARAM), 2002, 4 pages.
Stormscope Lightning Detection Systems, L3 Avionics Systems, retrieved on Jul. 11, 2011, 6 pages.
US Office Action on U.S. Appl. No. 13/717,052 Dated Mar. 27, 2014, 6 pages.
Decision on Appeal for Inter Parties Reexamination Control No. 95/001,860, dated Oct. 17, 2014, 17 pages.
Final Office Action on U.S. Appl. No. 12,892,663 dated Mar. 7, 2013, 13 pages.
Final Office Action on U.S. Appl. No. 13/238,606 Dated Apr. 1, 2014, 11 pages.
Final Office Action on U.S. Appl. No. 13/238,606 Dated Jan. 22, 2015, 6 pages.
Non-Final Office Action on U.S. Appl. No. 12/892,663 Dated May 29, 2013, 14 pages.
Non-Final Office Action on U.S. Appl. No. 13/238,606 Dated Jul. 8, 2014, 12 pages.
Non-Final Office Action on U.S. Appl. No. 13/238,606 Dated Sep. 23, 2013, 15 pages.
Non-Final Office Action on U.S. Appl. No. 13/717,052 Dated Feb. 11, 2015, 15 pages.
Notice of Allowance on U.S. Appl. No. 13/246,769 Dated Jan. 8, 2015, 10 pages.
Notice of Allowance on U.S. Appl. No. 13/707,438 Dated Feb. 25, 2015, 11 pages.
Office Action for U.S. Appl. No. 12/892,663, mail date Oct. 22, 2012, 12 pages.
TOA Technology, printed from website: http://www.toasystems.com/technology.html on Dec. 29, 2010, 2 pages.
Triangulation, from Wikipedia, printed from website: http://en.wikipedia.org/wiki/Triangulation on Dec. 29, 2010, 6 pages.
U.S. Appl. No. 14/206,239, filed Mar. 12, 2014, Rockwell Collins.
Final Office Action on U.S. Appl. No. 13/246,769 Dated Sep. 16, 2014, 18 pages.
Non-Final Office Action on U.S. Appl. No. 13/717,052 Dated Sep. 9, 2014, 8 pages.
Notice of Allowance on U.S. Appl. No. 12/075,103 Dated Aug. 4, 2014, 10 pages.
U.S. Appl. No. 13/246,769, filed Sep. 27, 2011, Rockwell Collins.
Non-Final Office Action on U.S. Appl. No. 14/452,235 Dated Apr. 23, 2015, 9 pages.
Non-Final Office Action on U.S. Appl. No. 14/681,901 Dated Jun. 17, 2015, 21 pages.
Non-Final Office Action on U.S. Appl. No. 13/841,893 Dated Jun. 22, 2015, 27 pages.
Non-Final Office Action on U.S. Appl. No. 13/913,100 Dated May 4, 2015, 25 pages.
Non-Final Office Action on U.S. Appl. No. 13/238,606 Dated May 27, 2015, 14 pages.

* cited by examiner

WEATHER RADAR THREAT DEPICTION SYSTEM AND METHOD

CROSS REFERENCE TO RELATED APPLICATIONS

The present application is related to U.S. application Ser. No. 13/707,438, filed Dec. 6, 2012 by Fersdahl, et al., U.S. application Ser. No. 13/841,893, filed Mar. 15, 2013 by Finely et al., U.S. application Ser. No. 12/075,103, filed Mar. 7, 2008 by Woodell, et al., and U.S. application Ser. No. 13/717,052, filed Dec. 17, 2012 by Woodell, et al, all assigned to the assignee of the present application and all incorporated herein by reference in their entireties.

BACKGROUND

The present disclosure relates generally to the field of weather display systems. More particularly, the present disclosure relates to a weather display system and method configured to display weather threats detected by a weather radar system.

Weather display systems are often used to alert operators of vehicles, such as aircraft pilots, of weather hazards in the area near the vehicle. Conventional weather display systems are configured to display weather data in two dimensions and often operate according to ARINC 453 and 708 standards. A horizontal plan view provides an overview of weather patterns near an aircraft mapped onto a horizontal plane. Generally the horizontal plan provides indications of precipitation rates in the vicinity of the aircraft. Red, yellow, and green colors are used to symbolize areas of respective precipitation rates, and black color symbolizes areas of very little or no precipitation. Each color is associated with radar reflectivity range which corresponds to a respective precipitation rate range. Red indicates the highest rates of precipitation while green represents the lowest (non-zero) rates of precipitation. Certain displays can also utilize a magenta color to indicate regions of turbulence.

A vertical profile view can illustrate weather cells along a plane for a particular set of ranges and altitudes and generally uses the red, yellow, green, black and magenta colors described above. Displays with vertical and/or horizontal views have been proposed which include icons for advanced weather threats that are not readily compatible with conventional displays. For example, conventional displays are not configured to easily display new hazards or threats, such as, the threats associated with predictive or inferential weather sensing systems, Thus, there is a need for a weather information display that provides more information than a conventional display. Further, there is a need for a threat depiction system and method that is compatible with conventional display platforms, such as the A453 and A661 platforms. There is another need for a weather radar system configured to easily display new hazards or threats, such as, those associated with predictive or inferential weather sensing systems using existing display formats and/or standards. There is also a need for an avionic weather radar system for and a method of displaying a core threat, an associated threat, and a predictive overflight threat using symbology compatible with conventional display platforms.

SUMMARY

An exemplary embodiment relates to a method of displaying images associated with weather near an aircraft. The method includes sensing a core threat based at least in part on reflectivity data from radar returns of a weather radar system of the aircraft. The method also includes displaying the images of the weather using at least a first color, a second color, and a third color associated with a respective first precipitation rate range, a respective second precipitation rate range, and a respective third precipitation rate range. The first precipitation rate range is less than the second precipitation rate range, and the third precipitation rate range is more than the second precipitation rate range. An area associated with the core threat has the second color when a precipitation rate of the area is within the first precipitation rate range, and the area has the third color when the precipitation rate of the area is within the second precipitation rate range.

Another exemplary embodiment rates to a method of displaying images associated with weather near an aircraft. The method includes sensing an associated threat based at least in part on reflectivity data from radar returns of a weather radar system of the aircraft. The method also includes displaying the images of the weather using at least a first color, a second color and a third color associated with a respective first precipitation rate range, a respective second precipitation rate range, and a respective third precipitation rate range. The first precipitation rate range is less than the second precipitation rate range, and the third precipitation rate range is more than the second precipitation rate range. An area associated with the associated threat is displayed as a speckled area.

Another exemplary embodiment relates to a method of displaying images associated with weather near an aircraft. The method includes sensing a predictive overflight threat based at least in part on reflectivity data from radar returns of a weather radar system of the aircraft. The method also includes displaying the images of the weather using at least a first color, a second color and a third color associated with a respective first precipitation rate range, a respective second precipitation rate range, and a respective third precipitation rate range. The first precipitation rate range is less than the second precipitation rate range, and the third precipitation rate range is more than the second precipitation rate range. An area associated with the predictive overflight threat is displayed as a wedge-shaped bounded region containing the first color, the second color or the third color.

Another embodiment relates to a system comprising an electronic processor configured to provide the images of weather on a display according to any of the methods described above. Another embodiment relates to one or more computer-readable storage media having instructions stored thereon that are executable by one or more processors to execute one or more of the methods described above. Still another exemplary embodiment relates to a system or method which implements two or three of the processes for the depiction of the core threat, the associated threat, or the predictive overflight threat described above.

BRIEF DESCRIPTION OF THE DRAWINGS

The disclosure will become more fully understood from the following detailed description, taken in conjunction with the accompanying figures, wherein like reference numerals refer to like elements, in which.

DETAILED DESCRIPTION

Before turning to the figures, which illustrate the exemplary embodiments in detail, it should be understood that the application is not limited to the details or methodology set forth in the description or illustrated in the figures. It should also be understood that the terminology is for the purpose of description only and should not be regarded as limiting. As discussed below, the systems and methods can be utilized in a number of display devices for various types of applications or sensing systems.

Referring generally to the figures, systems and methods for providing visual representations of weather cells in proximity to an aircraft or other vehicle are provided. According to one embodiment, advance weather threats can be displayed. For example, an embodiment of the system and method described herein can advantageously display predictive or inferred threats such as one or more of a core threat, associated threat, or predictive overflight threat. The threats are advantageously depicted using display formats compatible with A453, and A661 avionic display platforms. The display of advanced threats such as one or more of a core threat, associated threat, or predictive overflight threat allows more than conventional rain gage functionality for the display.

In one alternative embodiment, the threats are also displayable on at least one of navigation (NAV) displays, primary flight displays, electronic flight bag displays, tablets such as I-pad computers, synthetic vision system displays, head up displays (HUDs), wearable displays, Google glasses, etc. In addition, the threats can be displayed on ground-based and remote displays by downloading altitude-based weather models to support ground-based weather products or unmanned avionic vehicle (UAV) operations. The threats are displayed to quickly and intuitively provide the user (e.g., the pilot) with a relatively complete view of the weather near the aircraft that the user could not otherwise easily obtain.

Figure 1:
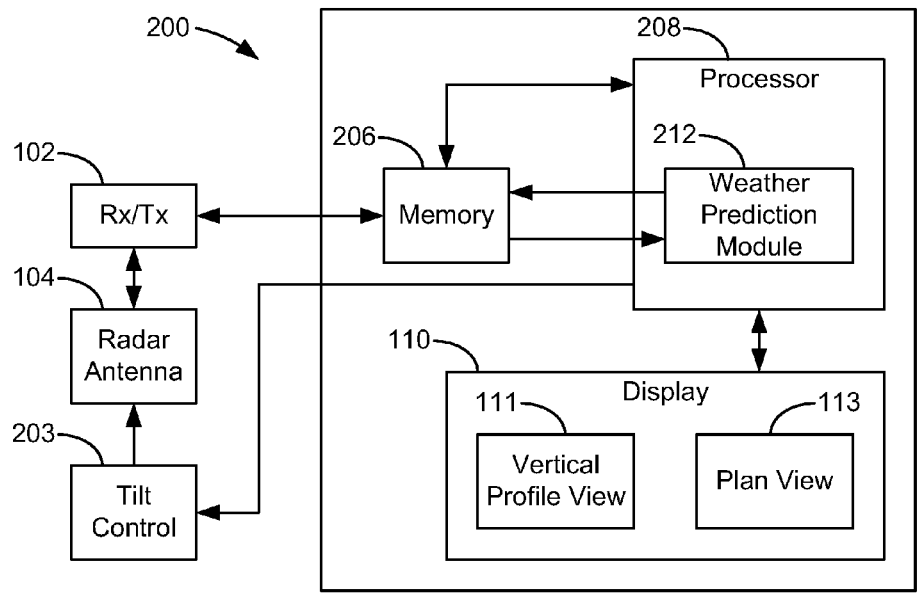
FIG. 1 is a general block diagram of a weather radar system that may be used, for example, on an aircraft according to an exemplary embodiment.
Figure 2:
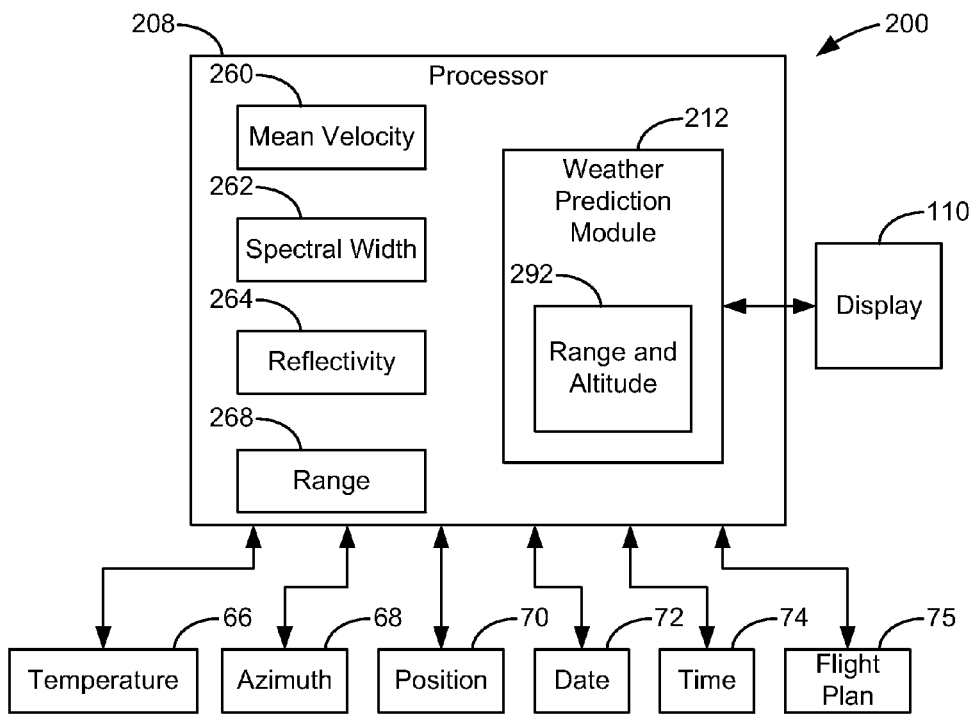
FIG. 2 is a more detailed block diagram of the weather radar system of FIG. 1 according to an exemplary embodiment.
Figure 3:
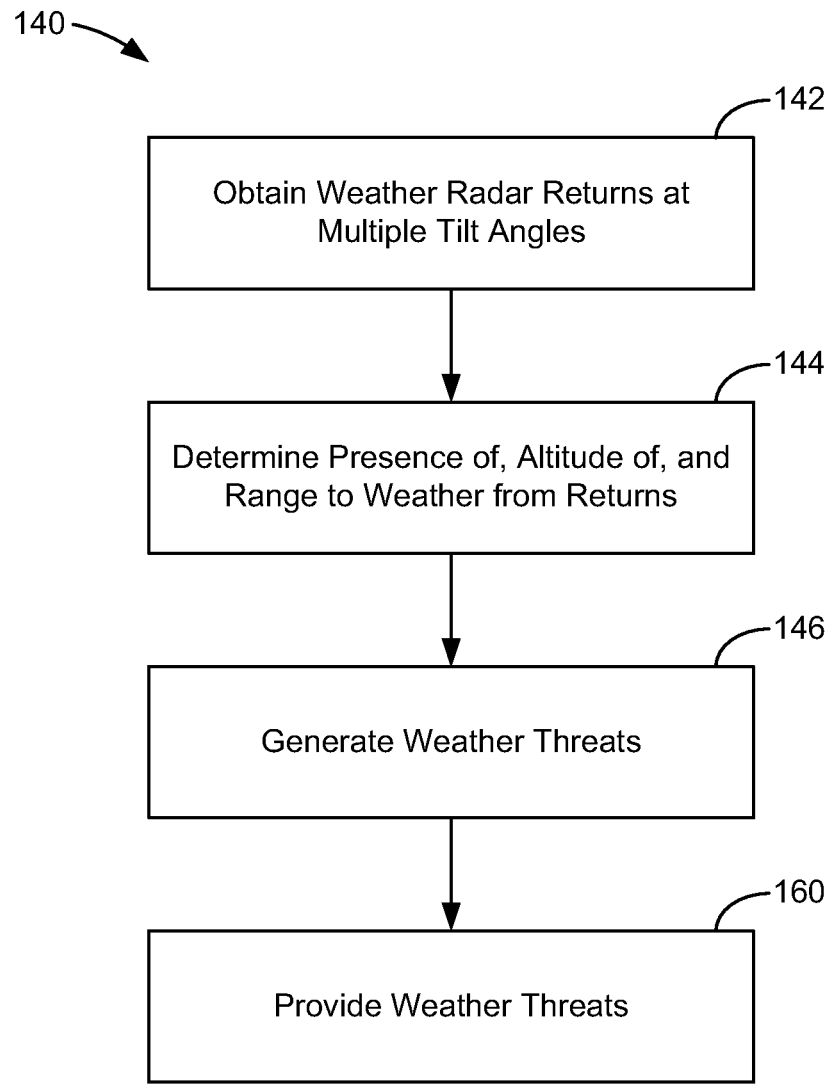
FIG. 3 is a flow diagram of a process for generating depictions of weather threats using weather data sensed by the system illustrated in FIG. 1 according to an exemplary embodiment.

Referring generally to FIGS. 1 through 3, systems and methods that may be used to generate images of weather are shown and described according to exemplary embodiments. In some embodiments, weather threats such as core threats, predictive overflight threats, and associated threats can be sensed and provided to a display. The threats can be sensed using techniques discussed in the applications incorporated herein by reference. The threats can be sensed using weather radar data from onboard or remote radar systems and using data from remote or onboard sensors (e.g., visible and infrared cameras, temperature sensors, lightning detectors, flight sensors, flight computers, etc.).

Referring specifically to FIG. 1, a block diagram of a weather radar system 200 that may be used, for example, on a vehicle such as an aircraft is depicted according to an exemplary embodiment. In one embodiment, system 200 may be an avionics multi-scan system manufactured by Rockwell Collins, such as the RTA-4218 MultiScan weather radar system or WXR-2100 weather radar system configured in accordance with the principles described herein. System 200 includes a weather prediction module 212 (e.g., circuit, module, or routine). Weather prediction module 212 advantageously determines the presence of weather at altitudes, ranges and locations based on a calculated value that can be displayed to the pilot of an aircraft. Weather prediction module 212 may be used to create a spatially correct weather interpretation that may be displayed in the range, altitude, and time domains. A combination of horizontal and selected vertical antenna beams may facilitate the collection of radar return data (IQ data) that can be used to compute parameters to construct an accurate weather model. The weather model may be altitude-based, and an estimate of the reflectivity based on radar returns may be obtained for any scan angle, range, and altitude combination. Weather prediction module 212 may store the altitude-based weather model in a memory 206, and the weather model may be used to extract weather information in a defined manner (e.g., based on user actions). Weather prediction module 212 can use storm top analysis, cell growth analysis, inferred or direct lightning detection, inferred or direct turbulence detection, cell height analysis, flat plan and heading information, temperature readings, etc., to sense a core threat, an associated threat, or a predictive overflight threat.

Avionics weather radar system 200 includes a weather radar receiver/transmitter 102, a weather radar adjustable antenna 104, a processor 208, and a memory 206 (e.g., a multi-scan, multi-tilt angle memory). System 200 also includes a tilt control 203 for automatically controlling the tilt angle (mechanical or electronic) of the antenna 104; this auto control may include an additional manual control feature as well.

Memory 206 may be capable of storing in a readily addressable and rapidly retrievable manner at least two data sets resulting from two or more antenna sweeps at different angles. Memory 206 can include any type of machine-readable storage device capable of storing radar returns or associated data for analysis/processing by processor 208. In some embodiments, memory 206 can store parameters of a weather model. The data in memory 206 can represent factors for a mathematical relationship defining reflectivity as a function of altitude in one embodiment. The data in memory 206 can be used by weather prediction module 212 to determine weather that should be displayed on display 110. Although a multi-scan, multi-tilt scanning and data sets are described, it should be understood by one of ordinary skill in the art that a single scan of data may also be used in some embodiments. Memory 206 can also be a three dimensional storage buffer for storing weather radar parameters according to X, Y and Z coordinates according to one embodiment. The storage of radar data and the form of the weather data stored therein is not disclosed in a limiting fashion. A variety of storage techniques for weather data can be used without departing from the scope of the invention.

Weather data can be stored in memory 206. The weather data can be based on received horizontal and/or vertical scans. In some embodiments, the data may be stored as a mathematical equation representation of the information. The mathematical equation representation may be a piecewise linear function, piecewise nonlinear function, coefficients of a cubic spline, coefficients of a polynomial function, etc. that represent vertical representations of the weather based on the horizontal scan data and/or horizontal representation of the weather based on the vertical scan data. The function may be an equation based on weather parameters that may be sensor driven, model driven, a merger of sensor and model, etc. Although horizontal scan data is described, alternative embodiments may include X, Y Cartesian coordinates, rho/theta input, latitude and longitude coordinates, altitude, etc. Weather may be estimated for any required point in space with the vertical dimension being the subject of the weather equation.

Display 110 can be part of an avionic multi-function display (MFD) unit in one embodiment. In some embodiments, display 110 may be any of a variety of display types, such as a navigation display, an electronic flight bag, a tablet computing device, a synthetic vision system, a heads up display (HUD), a dedicated weather display, or another type of display system. In some embodiments, display 110 may be a remote display not included within a cockpit of the aircraft, such as a ground-based support display or remote display configured to display information regarding whether near an unmanned aerial vehicle (UAV).

Processor 208 may be included as part of a multi-scan, multi-tilt angle weather radar system and may perform the customary functions performed by a conventional weather radar return processing unit. Processor 208 may also perform several additional operations based upon the additional data and/or instructions provided in memory 206. In general, processor 208 can merge or cross qualify portions, or ranges, of the radar returns of several different antenna sweeps at several different tilt angles, so that a single, relatively clutter-free image may be presented to the pilot based upon the several separate scans. The radar returns may be processed by processor 208 to generate a three-dimensional weather profile of the weather near the aircraft.

System 200 may perform a scanning operation by transmitting at least two beams at different tilt angles. In some embodiments, system 200 may use a global positioning system (GPS), terrain database, or other tool to control the tilt control 203. Data obtained from the radar returns (e.g., reflectivity data) may be stored in memory 206. For example, known ground clutter may be removed from each of the returns using ground clutter suppression techniques.

Referring again to FIG. 1, in some embodiments, processor 208 may be configured to store parametric characteristics of the vertical extent of the weather in memory 206 instead of detecting and storing the entire reflectivity profile in a traditional three-dimensional memory. For example, since the radar knows current altitude and outside air temperature, processor 208 can be configured to estimate the altitude of the local atmospheric freezing layer. Further, processor 208 can estimate the height of the troposphere based on latitude, season, or more precise FMS data. Using this information and radar elevation scan data collected from scanning processes (e.g., normal MultiScan two-tilt or three-tilt processes), processor 208 may generate a linear fit of the reflectivity data from the ground to the freezing layer and another linear fit between the freezing layer and top of the troposphere. Details associated with the vertical profile in this embodiment can include the ground height, freezing layer height, the troposphere height, the reflectivity level at ground level, the reflectivity level at freezing layer, and the reflectivity level at the troposphere top. This information is sufficient to generate a function which can generate vertical reflectivity at any altitude. In some embodiments, the reflectivity data may be generated at or near a time of rendering an image of the weather on display 110 by extrapolating the vertical weather data in real-time or near real-time. In some embodiments, the reflectivity data may be generated some amount of time in advance of rendering on display 110 and stored in memory 106 (e.g., a three-dimensional memory).

Some embodiments may use more complex curve fits. Specific curve fits can be utilized depending on geographical location, time of day, time of year, etc. For example, over Europe, a linear curve fit may suffice to determine vertical reflectivity between freezing layer and troposphere height whereas a second order fit may be required over the equatorial Pacific. A tag can be given to each cell denoting the specific order of the data fit and, correspondingly, the method used to obtain vertical data from the stored parameters. As additional data is collected, perhaps through dedicated vertical scans of convective cells, the functions can be updated or increased in complexity in order to improve their accuracy.

This process allows a rapid assessment of vertical cell extent, cell growth, cell tops, etc. with a minimum of data. Rapid assessment may significantly increase the speed of such an assessment in turns or during initial radar power up.

Processor 208 may process weather radar returns to identify or sense the presence of weather in front of or in view of the aircraft. Weather prediction module 212 may utilize the altitude and the range to the weather to generate a vertical profile associated with the weather. Weather prediction module 212 may scan across an array of azimuths to generate a three-dimensional weather profile of the weather near the aircraft, which may be stored for later presentation or immediately presented on display 110. Threats can be displayed on either view 111 or 113 or both view 111 and 113.

In some embodiments, additional visual indicators other than the representation of weather and indications of the core threat, the associated threat or the predictive overflight threat are provided on views 111 or 113. In some embodiments, a range and bearing matrix having range markers indicating distance from a current position of the aircraft and bearing markers indicating azimuths from a current flight path or bearing of the aircraft may be provided and may assist the pilot in cognitive recognition of weather features from the pilot's perspective.

Weather prediction module 212 can determine a core threat or core hazard assessment by inferring the presence of lightning and hail and by measuring reflectivity as a function of altitude within a highly reflective weather region. When lightning, hail or probability of convection within a reflective region is high, weather production module 212 senses a core threat and can adjust the color levels of weather provided on display 110 to represent the core threat or core hazard assessment to the pilot. In one embodiment, weather is displayed in accordance with protocols where red represents a high precipitation rate range (or high radar range of reflectivity), yellow represents a mid precipitation rate range (or mid range of radar reflectivity) and green represents a low precipitation rate range (or low range of radar reflectivity). In addition, magenta can be utilized to indicate turbulence regions. The core threat is shown as an adjusted color level corresponding to a higher precipitation rate in one embodiment.

Accordingly, the adjustment of the color more accurately reflects the environmental conditions that the aircraft will most likely encounter. Regions with lower rain rates that are associated with a core threat (e.g., associated with lightning and hail) are as dangerous as regions of higher rain rates without core threats. Advantageously, the use of existing colors and adjustment thereof for core threat depiction allows conventional display protocols and electronics to be used without major changes to display formats.

Weather prediction module 212 can also provide an associated threat or associated hazard assessment. An associated threat is comprised of both high altitude and low altitude environmental predictions of lightning, hail and/or turbulence. Low altitude threats can be predicted by algorithms that determine when the environment is conducive to produce either cloud-to-cloud or cloud-to-ground lightning. High altitude threats can be predicted by algorithms that determine the presence of tall convective cells that reach high altitudes and bloom outward into familiar anvil shapes of a cumulonimbus cell. The anvil portion of the cell reflects radar energy very poorly but is associated with a number of hazards including lightning, hail and turbulence. By sensing the anvil portion using techniques described in the applications incorporated herein by reference, weather prediction module 212 can determine an area associated with an associated threat. Storm top analysis can be utilized to identify tall convective cells that bloom outward in one embodiment. Using the relationship between temperature and reflectivity can identify associated threats in one embodiment. Higher reflectivities at lower temperatures indicate areas of hazards such as hail in one embodiment.

In one embodiment, an associated threat can be a presence of high altitude ice crystals. Processor 208 and module 212 can use the techniques described in U.S. application Ser. No. 13/841,893 filed Mar. 15, 2013 by Finely et al, incorporated herein by reference to identify regions of high altitude crystal ice.

Processor 208 causes display 110 to display areas associated with an associated threat (e.g., high altitude threat, low altitude threat, ice crystal threat) as uniformly organized speckles of red or yellow color in one embodiment. The speckled pattern can either be bounded or unbounded and can have a variety of shape profiles including rounded or straight edges. The speckles can vary in shape and size based on selected range, determined threat level and spatial extent. For example, if the threat is close, the speckles can be made larger, or if the associated threat is large, the speckles can be made larger. The speckled pattern can be bounded by a color which is not red, or yellow in one embodiment.

Weather prediction module 212 can also sense a predictive overflight threat. A predictive overflight threat is determined when a cell is growing from low altitudes below the aircraft flight altitude. Generally in conventional systems, such low altitude weather is removed from the display when it is far below the aircraft since it is not significant to aircraft operations. However, if such low altitude weather is growing and it is within the flight path of the aircraft, such weather can pose a predictive overflight threat. Weather prediction module 212 can utilize position information, time information and flight path information as well as sensing a growing cell to determine that a growing cell is within the flight path of the aircraft and provide a display icon for the predictive overflight threat in one embodiment.

In one embodiment, a predictive overflight threat display icon can be a boundary containing uniformly organized speckles, (e.g., red or yellow). The boundary can be wedge shaped having two linear segments that diverge from each other and two curvilinear segments connecting the two linear segments in one embodiment. The boundary color can be the same or different as the speckled colors. According to another embodiment, a target-shaped pattern using weather colors can be provided within the wedge-shaped boundary to depict the predictive overflight threat.

With reference to FIG. 2, processor 208 of system 200 can receive additional parameters associated with the weather radar return data. The additional parameters can be utilized to improve the quality of the weather prediction.

Processor 208 can provide a mean velocity parameter 260 and a spectral width parameter 262 derived from weather radar returns. Alternatively, other types of velocity parameters can be utilized. In addition, processor 208 can provide a reflectivity parameter 264 and a range parameter 268 to circuit 212. Computed range or range parameter 268 along with scan angle position can be used to plot the position of weather on display 110. Processor 208 can also receive a temperature parameter 66, an azimuth 68, a position 70, a date 72, flight plan 75 and time 74. Alternatively, a separate temperature sensor 66 can be coupled to processor 208. Parameters 260, 262, 264, and 268 can be computed by processor 208 using data stored in memory 206.

Processor 208 can use parameters 260, 262, 264, and 268 to determine hazards. Parameters 260, 262, 264, and 268 can also be used to improve the quality of the weather prediction. For example, if processor 208 determines that the weather includes a convective cell that is growing, that characteristic can be considered when determining the height and/or other characteristic of the weather as discussed above.

With reference to FIG. 3, a flowchart illustrates a process 140 in which processor 208 of system 200 provides signals, either directly to receiver/transmitter circuit 102 or indirectly through memory 206, to provide radar beams at radar antenna 104. In some embodiments, process 140 may be implemented using instructions stored on a machine-readable medium (e.g., memory 206) and executed on a processor (e.g., processor 208). Processor 208 may be configured to operate system 200 as a pulse Doppler multi-scan, multi-tilt angle radar system or a volumetric radar system in which radar beams are produced at more than one tilt angle. Processor 208 receives radar returns through receiver/transmitter circuit 102.

Processor 208 can receive the radar returns (or signals/data related thereto) directly or through memory 206 at a step 142. Receiver/transmitter circuit 102 can be a single path or can have separate circuits for a receive path and a transmit path. Processor 208 may determine power associated with the radar returns.

Processor 208 processes the weather radar returns to determine the presence of weather and the altitude and range of weather (e.g., based on reflectivity) (144). In one embodiment, the altitude of weather can be determined by comparing power levels of radar returns at different tilt angles.

Weather prediction module 212 can generate a weather profile at a given range and over a defined altitude. Weather prediction module 212 can generate a vertical profile for a given range and azimuth at an altitude or an altitude range for the weather. Module 212 uses inferential detection techniques to determine advanced threats (e.g., core threat, associated threat, or predictive overflight threat) at a step 146. The threats are displayed at a step 160.

Figure 4:
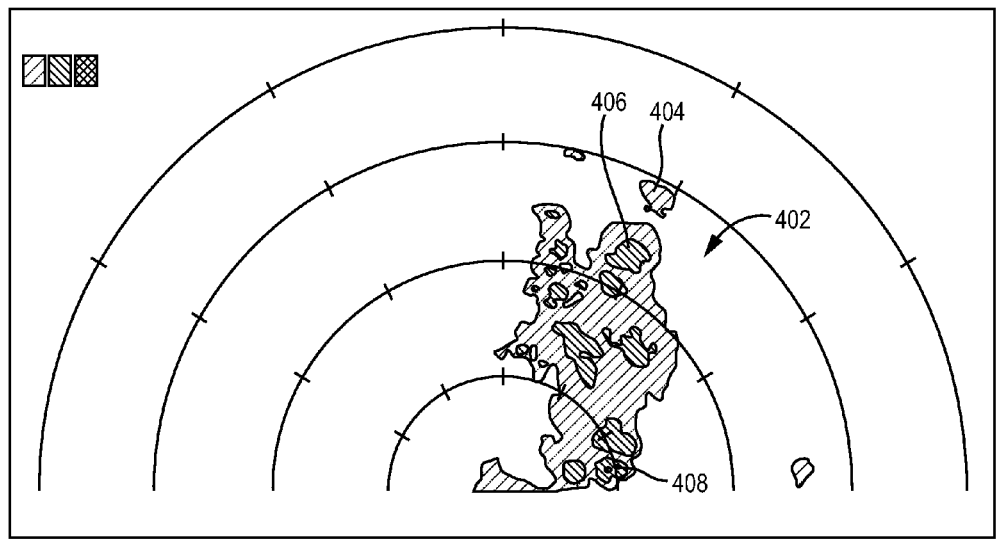
FIG. 4 is a display image of weather on a conventional display.

With reference to FIG. 4, a conventional display displays weather 402 having a first color 404, a second color 406 and a third color 408. Colors 404, 406 and 408 symbolize a respective precipitation rainfall rate range.

Figure 5:
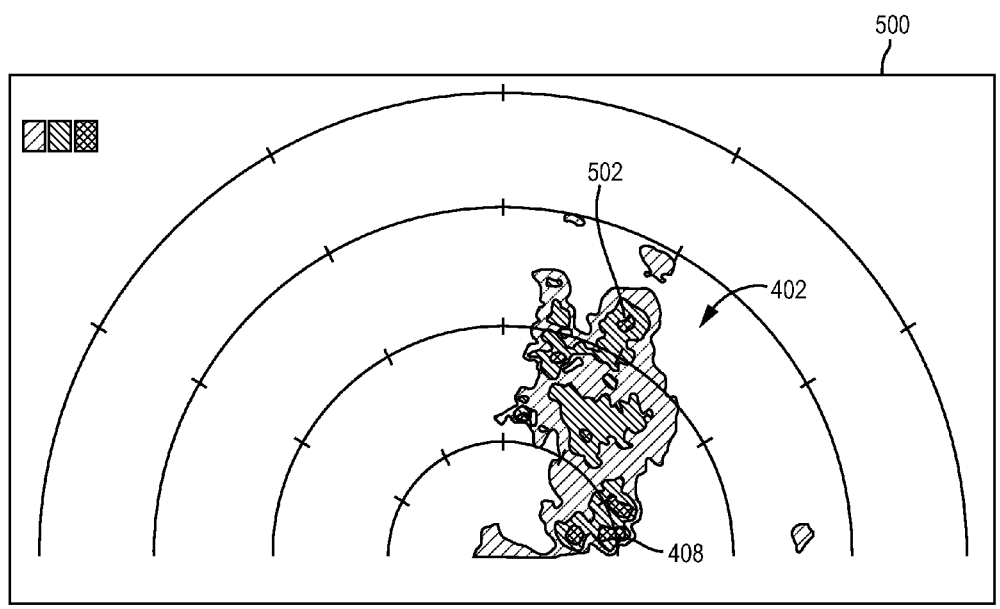
FIG. 5 is a display image of the weather illustrated in FIG. 4 including a core threat according to a further exemplary embodiment.

With reference to FIG. 5, weather 402 is also shown on a display 500 according to an exemplary embodiment. However, display 500 shows core threats 502 indicated by an increased color level according to one embodiment. As can be seen, color level 406 includes a region 502 which has a color level 408. The increased color level is due to the sensing of the core threat, not the precipitation rainfall rate according to one embodiment.

Figure 6:
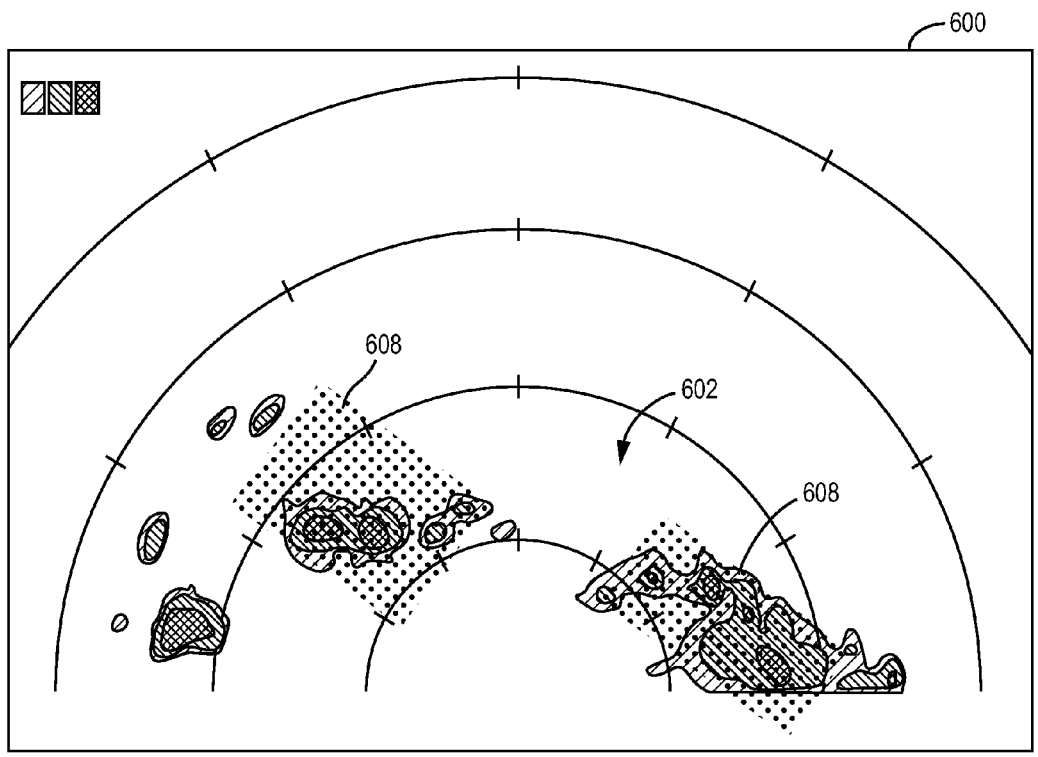
FIG. 6 is a display image of weather including an associated threat according to an exemplary embodiment.
Figure 7:
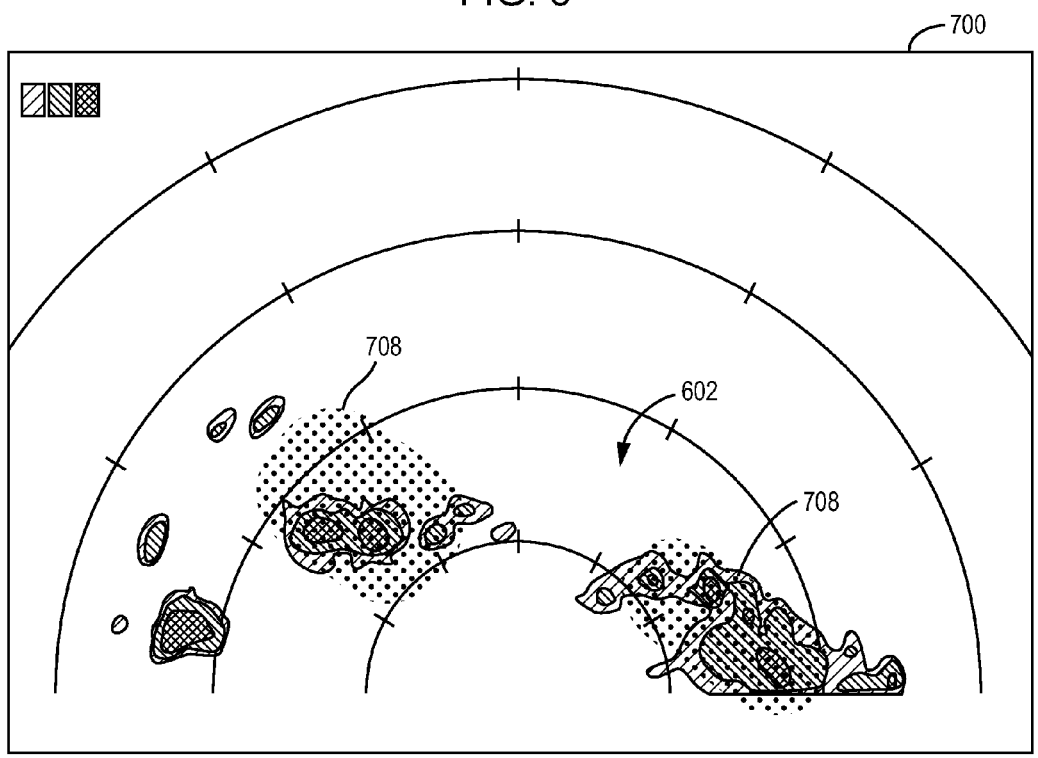
FIG. 7 is a display image of weather including an associated threat according to another exemplary embodiment.

With reference to FIG. 6, a display 600 of weather 602 includes associated threats shown in speckled regions 608 according to one embodiment. Regions 608 have linear borders and are uniformly-distributed as colored speckles (yellow or red). With reference to FIG. 7, image 700 of weather 602 includes associated threat areas 708 indicated by speckled regions with rounded corners in one embodiment. Rounded corners provide a more weather-like appearance as opposed to square corners according to one embodiment. In one embodiment, rounded edges allow the pilot to more easily follow a flight path along a tangent to the rounded corner when avoiding the associated threat.

Figure 8:
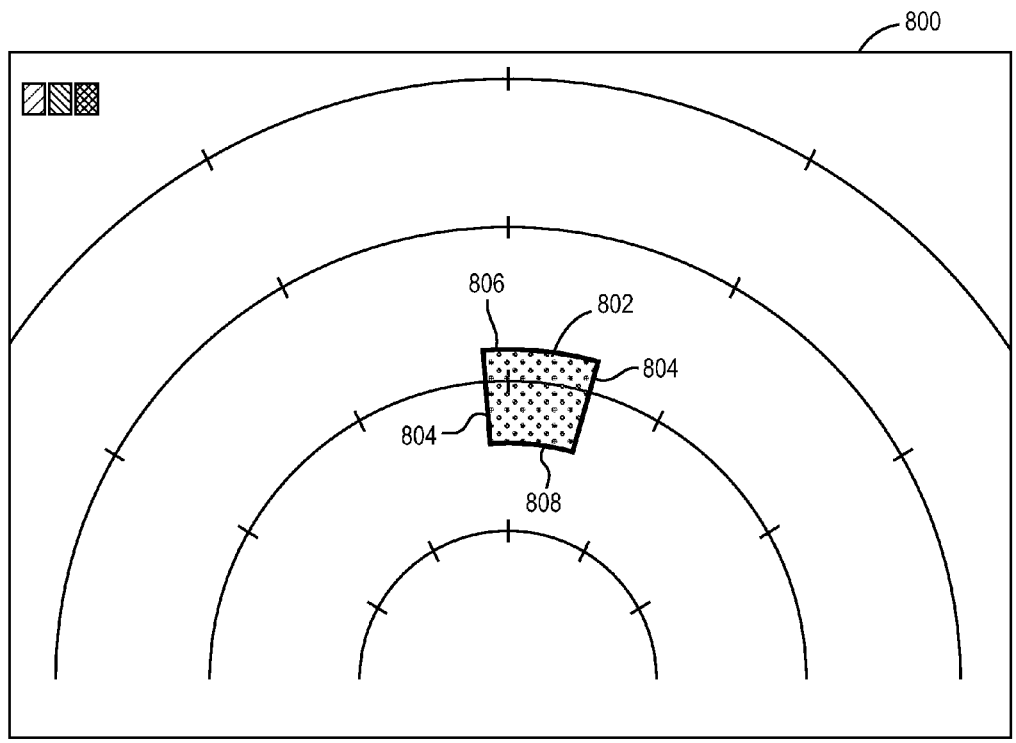
FIG. 8 is a display image of a predictive overflight threat in accordance with another exemplary embodiment.
Figure 9:
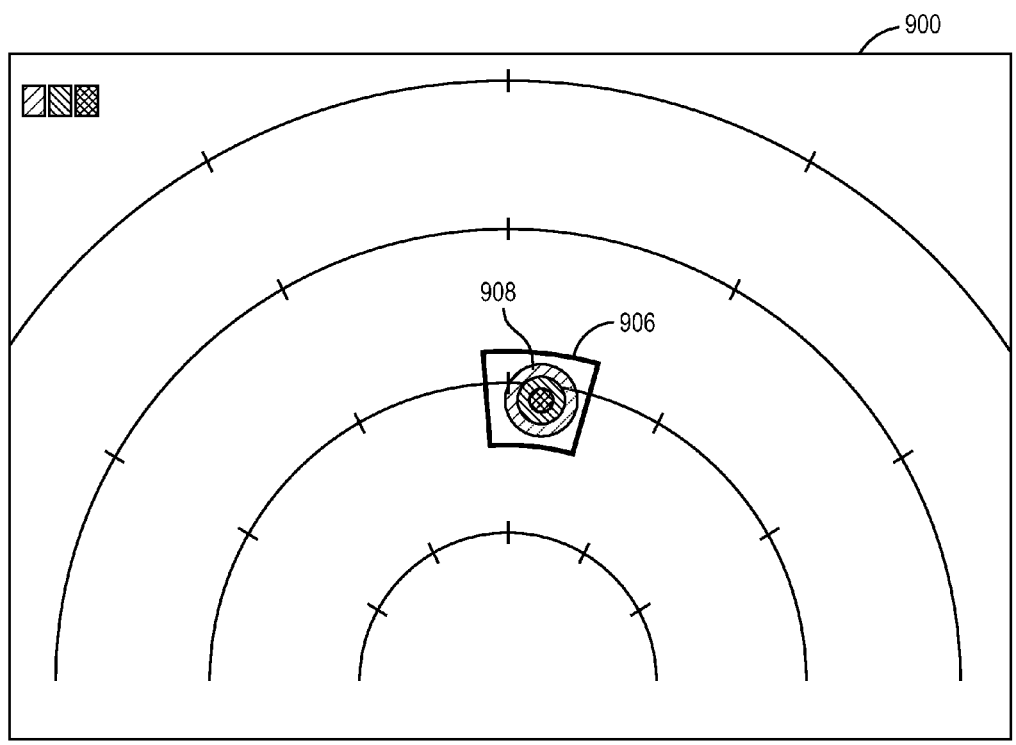
FIG. 9 is a display image of a predictive overflight threat according to yet another exemplary embodiment.

With reference to FIG. 8, a display 800 shows a predictive overflight threat as an icon 802. Icon 802 includes diverging linear segments 804 and curvilinear segments 806 and 808 in one embodiment. Segments 804, 806, and 808 can be any color (e.g., magenta, red, yellow, green, etc.) In one embodiment, segment 806 has a greater arc length than segment 808. With reference to FIG. 9, a display 900 includes a predictive overflight threat as an icon 906. Predictive overflight threat icon 906 is a wedge-shaped icon and includes a target-shaped symbol 908 including three colors in one embodiment. The three colors can be displayed in any order. In one embodiment, the symbol 908 includes a green ring, a yellow ring and a red circle in a target configuration. The green ring is the larger than the yellow ring in on embodiment.

Weather prediction module 212 can be implemented using hardware, software, or a combination thereof. In one embodiment, module 212 is a software routine that operates within processor 208. Although shown as part of processor 208, module 212 can be a separate circuit or be provided between display 110 and processor 208. According to one embodiment, module 212 can be implemented upon its own processor platform. In some embodiments, weather prediction module 212 determines the range and altitude associated with the sensed weather. The range and altitude may be used so that weather prediction module 212 can generate a vertical profile for sensed weather. One or more vertical profiles may be used to generate a three-dimensional weather profile of weather in proximity to the aircraft for display on display 110.

The disclosure is described above with reference to drawings. These drawings illustrate certain details of specific embodiments that implement the systems and methods and programs of the present disclosure. However, describing the disclosure with drawings should not be construed as imposing on the disclosure any limitations that may be present in the drawings. The present disclosure contemplates methods, systems and program products on any machine-readable media for accomplishing its operations. The embodiments of the present disclosure may be implemented using an existing computer processor, or by a special purpose computer processor incorporated for this or another purpose or by a hardwired system. No claim element herein is to be construed under the provisions of 35 U.S.C. §112, sixth paragraph, unless the element is expressly recited using the phrase "means for." Furthermore, no element, component or method step in the present disclosure is intended to be dedicated to the public, regardless of whether the element, component or method step is explicitly recited in the claims.

As noted above, embodiments within the scope of the present disclosure include program products comprising machine-readable storage media for carrying or having machine-executable instructions or data structures stored thereon. Such machine-readable storage media can be any available media which can be accessed by a general purpose or special purpose computer or other machine with a processor. By way of example, such machine-readable storage media can comprise RAM, ROM, EPROM, EEPROM, CD ROM or other optical disk storage, magnetic disk storage or other magnetic storage devices, or any other medium (e.g., non-transitory medium) which can be used to carry or store desired program code in the form of machine-executable instructions or data structures and which can be accessed by a general purpose or special purpose computer or other machine with a processor. Combinations of the above are also included within the scope of machine-readable storage media. Machine-executable instructions comprise, for example, instructions and data which cause a general purpose computer, special purpose computer, or special purpose processing machine to perform a certain function or group of functions.

Embodiments of the disclosure are described in the general context of method steps which may be implemented in one embodiment by a program product including machine-executable instructions, such as program code, for example, in the form of program modules executed by machines in networked environments. Generally, program modules include routines, programs, objects, components, data structures, etc., that perform particular tasks or implement particular abstract data types. Machine-executable instructions, associated data structures, and program modules represent examples of program code for executing steps of the methods disclosed herein. The particular sequence of such executable instructions or associated data structures represent examples of corresponding acts for implementing the functions described in such steps.

Embodiments of the present disclosure may be practiced in a networked environment using logical connections to one or more remote computers having processors. Logical connections may include a local area network (LAN) and a wide area network (WAN) that are presented here by way of example and not limitation. Such networking environments are commonplace in office-wide or enterprise-wide computer networks, intranets and the Internet and may use a wide variety of different communication protocols. Those skilled in the art will appreciate that such network computing environments will typically encompass many types of computer system configurations, including personal computers, hand-held devices, multi-processor systems, microprocessor-based or programmable consumer electronics, network PCs, servers, minicomputers, mainframe computers, and the like. Embodiments of the disclosure may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing the overall system or portions of the disclosure might include a general purpose computing device in the form of a computer, including a processing unit, a system memory, and a system bus that couples various system components including the system memory to the processing unit. The system memory may include read only memory (ROM) and random access memory (RAM) or other non-transitory storage medium. The computer may also include a magnetic hard disk drive for reading from and writing to a magnetic hard disk, a magnetic disk drive for reading from or writing to a removable magnetic disk, and an optical disk drive for reading from or writing to a removable optical disk such as a CD ROM or other optical media. The drives and their associated machine-readable media provide nonvolatile storage of machine-executable instructions, data structures, program modules, and other data for the computer.

It should be noted that although the flowcharts provided herein show a specific order of method steps, it is understood that the order of these steps may differ from what is depicted. Also two or more steps may be performed concurrently or with partial concurrence. Such variation will depend on the software and hardware systems chosen and on designer choice. It is understood that all such variations are within the scope of the disclosure. Likewise, software and web implementations of the present disclosure could be accomplished with standard programming techniques with rule based logic and other logic to accomplish the various database searching steps, correlation steps, comparison steps and decision steps. It should also be noted that the word "component" as used herein and in the claims is intended to encompass implementations using one or more lines of software code, and/or hardware implementations, and/or equipment for receiving manual inputs.

The foregoing description of embodiments of the disclosure have been presented for purposes of illustration and description. It is not intended to be exhaustive or to limit the disclosure to the precise form disclosed, and modifications and variations are possible in light of the above teachings or may be acquired from practice of the disclosure. The embodiments were chosen and described in order to explain the principals of the disclosure and its practical application to enable one skilled in the art to utilize the disclosure in various embodiments and with various modifications as are suited to the particular use contemplated.

What is claimed is:

1. A method of displaying images associated with weather near an aircraft performed by a weather radar system, the method comprising:
    sensing, by a processor of a weather radar system, a core threat based at least in part on reflectivity data from radar returns of the weather radar system of the aircraft; and
    causing, by the processor of the weather radar system, a weather radar display system to display the images of the weather using at least a first color, a second color, and a third color associated with a respective first precipitation rate range, a respective second precipitation rate range, and a respective third precipitation rate range; wherein the first precipitation rate range is indicative of less precipitation than the second precipitation rate range and the third precipitation rate range is indicative of more precipitation than the second precipitation rate range, wherein an area associated with the core threat has the second color when a precipitation rate of the area is between the first precipitation rate range and the area has the third color when a precipitation rate of the area is between the second precipitation rate range.

2. The method of claim 1, further comprising:
    sensing, by the processor of the weather radar system, an associated threat; and
    causing, by the processor of the weather radar system, the weather radar display system to display an area associated with the associated threat as a speckled area.

3. The method of claim 2, wherein the specked area is bordered.

4. The method of claim 2, wherein the first color is green, the second color is yellow and the third color is red, wherein the speckled area includes uniformly distributed yellow or red dots.

5. The method of claim 1, further comprising:
    sensing, by the processor of the weather radar system, a predictive overflight threat; and
    causing, by the processor of the weather radar system, the weather radar display system to display an area associated with the predictive overflight threat as a wedge-shaped bounded region containing the first color, the second color or the third color.

6. The method of claim 5, wherein a boundary for the wedge-shaped bounded region is a fourth color different than the first color, the second color and the third color.

7. The method of claim 5, wherein the wedge-shaped bounded region includes uniformly distributed green, yellow and red dots.

8. The method of claim 5, wherein the wedge-shaped bounded region includes a target pattern including green, yellow, and red colors.

9. The method of claim 5, wherein the wedge-shaped bounded region includes two diverging segments, each connected to two curvilinear segments.

10. A system for displaying images associated with weather near an aircraft, comprising:
    at least one processor coupled with a non-transitory processor-readable medium storing processor-executable code for causing the at least one processor to:
        sense an associated threat based at least in part on reflectivity data from radar returns of a weather radar system of the aircraft; and
        cause a weather radar display system to display the images of the weather using at least a first color, a second color, and a third color associated with a respective first precipitation rate range, a respective second precipitation rate range, and a respective third precipitation rate range, wherein the first precipitation rate range is less than the second precipitation rate range and the third precipitation rate range is more than the second precipitation rate range, wherein an area associated with the associated threat is displayed as a speckled area.

11. The system of claim 10, wherein the non-transitory processor-readable medium further stores processor-executable code for causing the at least one processor to:
    sense a core threat, wherein an area associated with the core threat has the second color when a precipitation rate of the area is between the first precipitation rate range and the area associated with the core threat has the third color when a precipitation rate of the area is between the second precipitation rate range.

12. The system of claim 11, wherein the non-transitory processor-readable medium further stores processor-executable code for causing the at least one processor to:
    sense a predictive overflight threat; and
    cause the weather radar display system to display an area associated with the predictive overflight threat as a wedge-shaped bounded region containing the first color, the second color or the third color.

13. The system of claim 12, wherein the non-transitory processor-readable medium further stores processor-executable code for causing the at least one processor to cause the weather radar display system to display the images of the weather using ARINC 453 and 708 standards of operation.

14. The system of claim 12, wherein a boundary for the wedge-shaped bounded region is a fourth color different than the first color, the second color and the third color.

15. The system of claim 10, wherein the associated threat is associated with an anvil region or high altitude ice.

16. The system of claim 10, wherein the associated threat is a low altitude threat.

17. A method of displaying images associated with weather near an aircraft performed by a weather radar system, the method comprising:
    sensing, by a processor of a weather radar system, a predictive overflight threat based at least in part on reflectivity data from radar returns of the weather radar system of the aircraft; and causing, by the processor of the weather radar system, a weather radar display system to display the images of the weather using at least a first color, a second color, and a third color associated with a respective first precipitation rate range, a respective second precipitation rate range, and a respective third precipitation rate range, wherein the first precipitation rate range is less than the second precipitation rate range and the third precipitation rate range is more than the second precipitation rate range, wherein an area associated with the predictive overflight threat is displayed as a wedge-shaped bounded region containing the first color, the second color, or the third color.

18. The method of claim 17, wherein a boundary for the wedge-shaped bounded region is a fourth color different than the first color, the second color and the third color.

19. The method of claim 18, wherein the wedge-shaped bounded region includes uniformly distributed green, yellow and red dots.

20. The method of claim 19, wherein the wedge-shaped bounded region includes a target pattern including green, yellow, and red colors.

\* \* \* \* \*